United States Patent [19]

Ron

[11] Patent Number: 4,823,899

[45] Date of Patent: Apr. 25, 1989

[54] STEERING APPARATUS

[75] Inventor: Shimon Ron, Givataim, Israel

[73] Assignee: Ashot Ashkelon Industries Ltd., Ashkelon, Israel

[21] Appl. No.: 183,385

[22] Filed: Apr. 13, 1988

Related U.S. Application Data

[63] Continuation of Ser. No. 884,188, Jul. 10, 1986, abandoned.

[51] Int. Cl.⁴ .............................................. B62D 9/00
[52] U.S. Cl. .................................. 180/140; 180/142; 180/236; 280/91
[58] Field of Search ............... 180/140, 142, 233, 234, 180/236, 308, 79.1; 280/91

[56] References Cited

U.S. PATENT DOCUMENTS

| | | | |
|---|---|---|---|
| 3,197,229 | 7/1965 | Houlton | 280/91 |
| 3,202,238 | 8/1965 | Strader | 180/140 |
| 3,255,840 | 6/1966 | Tangen | 180/236 |
| 3,556,243 | 1/1971 | Susag et al. | 180/140 |
| 3,604,528 | 9/1971 | Williamson | 180/140 |
| 4,140,199 | 2/1979 | Lester | 180/140 X |
| 4,219,094 | 8/1980 | Sturgill | 180/236 |
| 4,263,979 | 4/1981 | Sturgill | 180/142 X |
| 4,284,159 | 8/1981 | Voelz | 180/140 |
| 4,372,725 | 2/1983 | Moore et al. | 180/236 |
| 4,444,287 | 4/1984 | Voelz | 180/308 X |
| 4,457,389 | 7/1984 | Voelz | 180/140 |
| 4,566,553 | 1/1986 | McCutcheon | 180/142 X |

FOREIGN PATENT DOCUMENTS

| | | | |
|---|---|---|---|
| 2438617 | 7/1976 | Fed. Rep. of Germany | 180/140 |
| 2208370 | 6/1974 | France | 180/236 |

*Primary Examiner*—David M. Mitchell
*Assistant Examiner*—Mitchell J. Hill
*Attorney, Agent, or Firm*—Abelman Frayne Rezac & Schwab

[57] ABSTRACT

A steering system for vehicles operative in a number of modes, requiring a narrow wheelbase for travelling on highways, and a wide wheelbase for performing tasks, typically agricultural. The steering system enables each of the wheels connected with such a vehicle to be steered independently, thus enabling movement in any direction, and full turns, to include turning about its geometrical center.

Additional computerized systems are provided for the regulation of steering and for the regulation of a power transfer system conventionally used to transfer power to agricultural machinery.

9 Claims, 9 Drawing Sheets

STEERING APPARATUS

This application is a continuation of application Ser. No. 884,188, filed on July 10, 1986, now abandoned.

FIELD OF THE INVENTION

The present invention relates to vehicles, such as tractors, which are operative in a plurality of modes, such as highway mode and off-highway mode, and to steering apparatus and computer controlled systems therefor.

BACKGROUND OF THE INVENTION

Many types of vehicles, and particularly tractors, are operative in a number of different modes, which require different orientation of their wheels.

The present inventor has appreciated that tractors should be designed to have a relatively wide wheelbase in order to enable them to carry out a given function over a field in a minimum of transversals, thereby saving time and fuel and reducing the damage to crops due to traversal of the tractor as well as reducing the number of tractor traversable separations between crops. Further advantages, such as non-interference with irrigation conduits and the like, may also be appreciated.

A concomitant requirement in the design of a tractor is that it be capable of self-propulsion over the highway transport. It may be appreciated that, due to its wheelbase, a tractor of the design described hereinabove could not travel along a highway of the same wheelbase. It is thus necessary to orient the tractor along a narrower profile for highway transport.

A further important design principle requires that a tractor be capable of a 180 degree turn about a pivot axis defined by one of its wheels, so as to enable the tractor to turn at the end of a row and return along an adjacent row with the pivot wheel in the same channel.

An additional principle of design requires that a tractor be capable of a full turn about a pivot axis defined by its geometric center, or by the mid-point of an imaginary line joining two wheels along the narrower wheelbase.

A further important design feature of tractors is that of efficient power transmission for agricultural machinery connected thereto and powered thereby. A measure of power required by machinery is the number of Revolutions Per Minute (RPM) of its motor or of other similar motive apparatus.

With machinery powered by the Power Take Off (PTO) of a conventional tractor, it is usual, that in order to obtain a high number of RPM at the PTO, through which power is transferred to connected machinery, the tractor engine is also required to revolve at the same rate of RPM, this being particularly wasteful of fuel.

SUMMARY OF THE INVENTION

The present invention seeks to provide a vehicle having the capabilities described hereinabove, steering apparatus for such a vehicle and an advanced system of hydraulic power transmission of additional machinery powered by such a vehicle.

There is thus provided in accordance with an embodiment of the present invention steering apparatus for a vehicle such as a tractor and comprising first, second, third and fourth wheels pivotably and rotatably mounted onto a chassis, positioning apparatus associated with the first, second, third and fourth wheels including first positioning apparatus for selectably positioning all of the wheels in first and second extreme positions and second positioning apparatus associated with the second and third wheels, and operative when the first and fourth wheels are in the second extreme position for providing steering of the second and third wheels.

Further in accordance with an embodiment of the present invention, the first and second positioning apparati comprise fluid operated pistons. In accordance with a preferred embodiment of the present invention, the first, second, third and fourth wheels are pivotably mounted at vertices of an imaginery rectangle whereby the first and second wheels are separated by a first distance, the third and fourth wheels are separated by the first distance, the second and third wheels are separated by a second distance, and the first and fourth wheels are separated by the second distance. The first distance is selected to be larger than the second distance and to represent the wheelbase of the vehicle for off-highway operation and the second distance is selected to be the wheelbase of the vehicle for highway operation. The first and second wheels are selected to be at the leading end of the vehicle for off-highway operations and the second and third wheels are selected to be at the leading end of the vehicle for highway operations.

Additionally, in accordance with an embodiment of the present invention, the first positioning apparatus comprise first, second, third and fourth fluid operated piston and cylinder assemblies associated with the first, second, third and fourth wheels respectively for providing selectable pivotal positioning thereof. The first and second piston and cylinder assemblies each comprise two pistons arranged in back-to-back relationship for individual series operation in providing predetermined angled positioning of the first and second wheels. All of the piston assemblies are provided with a maximum stroke which produces a 90 degree rotation in the orientation of the associated wheel.

In accordance with a preferred embodiment of the present invention, the second positioning apparatus comprises a bi-directional piston assembly, which is coupled at opposite ends thereof to the second and third piston and cylinder assemblies in a series arrangement with each of them separately.

Further in accordance with an embodiment of the present invention, each of the four wheels is provided with an individual hydraulic wheel motor. The first and fourth wheel motors are associated with a first variable hydraulic pump, while the second and third wheel motors are associated with a second variable hydraulic pump. Fluid communication between the first and second hydraulic pumps is permitted for highway mode operation but is prevented for off-highway mode operation other than during turning. Apparatus is also provided for supplying all of the hydraulic fluid power to a selected pair of wheels during highway mode operation.

Additionally in accordance with an embodiment of the invention, the third and fourth wheels are provided with brake apparatus for securing a wheel in a fixed orientation when it defines a pivot location during turning operation.

Further in accordance with an embodiment of the present invention, there is provided a computerized steering system comprising: a computer; a plurality of hydraulic valves, each of which is adapted to respond to computer signals; a plurality of angular resolvers, each of which is located on a wheel and is adapted to "read" the angle of pitch of that wheel and to feed that information to the computer; and a plurality of hydraulic pistons, each of which is associated with a wheel and which is activated by one of the hydraulic valves.

Additionally in accordance with an embodiment of the present invention, the computer is adapted to receive a turning instruction from an operative, whereupon the computer will check the pitch of each of the wheels by means of the angular resolvers, and send an instruction, in accordance with the information received, to the valve, thus releasing a quantity of hydraulic oil under pressure to the piston such that the wheels are turned in accordance with the original turning instruction.

Further in accordance with an embodiment of the present invention, a steering wheel is provided, which is adapted to pass turning instructions from the operative to the computer.

Additionally in accordance with an embodiment of the present invention, each of the plurality of angular resolvers comprises apparatus including a potentiometer.

Further in accordance with an embodiment of the present invention, the computer is additionally adapted to comprise part of a system which regulates the hydraulic power that a tractor is operative to supply, by way of a power take off transmission system, to a piece of hydraulically powered machinery connected thereto, which power supply is directly related to the rate of revolutions of an hydraulic motor to which the power take off is connected, and which regulating system additionally comprises: a variable output oil pump, which supplies oil to the hydraulic motor and which is connected to the computer; a diesel engine, to which the oil pump is connected; and a speed gauge, which measures the speed of advance of the tractor along the ground.

Additionally in accordance with an embodiment of the present invention, a thumbwheel is provided, which is adapted to pass instructions from the operative to the computer.

Further in accordance with an embodiment of the present invention, there is provided a method of regulating the supply of hydraulic power that the tractor is operative to supply to hydraulically powered machinery connected thereto, which power supply is directly related to the rate of revolutions of an hydraulic motor, which method comprises the steps of:

manually adjusting a thumbwheel, associated with a computer, according to a desired rate of revolutions per minute (RPM) needed to power the hydraulic machinery connected to the tractor;

the computer, being associated additionally with the Power Take Off (PTO) of the tractor, "reading" the actual rate of RPM and comparing the actual rate with that indicated by the thumbwheel, sending a signal to a variable output oil pump, with which it is further associated, to accordingly increase or decrease its rate of oil supply to an hydraulic motor connected to the PTO; and a diesel engine, associated with the oil pump, adjusting its RPM according to the total amount needed for the running of the tractor and of the agricultural machinery connected thereto.

Additionally in accordance with an embodiment of the present invention, there is provided a method of regulating the supply of hydraulic power that the tractor is operative to supply to hydraulically powered machinery connected thereto, which power supply is directly related to the rate of revolutions of an hydraulic motor, which method comprises the steps of:

an operative rotating and setting a thumbwheel, associated with a computer, according to a desired speed of forward advance of the tractor, and corresponding to a desired rate of revolutions per minute (RPM) of the Power Take Off (PTO) of a tractor;

the computer, being associated additionally with the PTO, "reading" the present speed of the tractor and comparing the present speed with that indicated by the thumbwheel, sending a signal to a variable output oil pump, with which it is further associated, to accordingly increase or reduce its rate of oil supply to an hydraulic motor connected to the PTO; and a diesel engine, associated with the oil pump, adjusting its speed according to that originally set by the operative.

BRIEF DESCRIPTION OF THE DRAWINGS

The present invention will be more fully understood and appreciated from the following detailed description taken in conjunction with the drawings in which.

DETAILED DESCRIPTION OF THE INVENTION

Figure 1A:
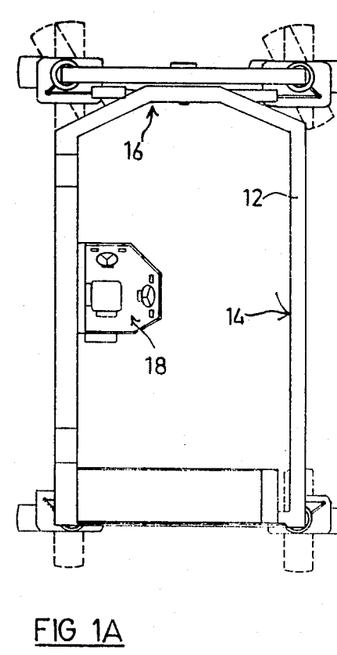
FIGS. 1A, 1B and 1C are respective top, side and end views of a tractor constructed and operative in accordance with an embodiment of the present invention.
Figure 1B:
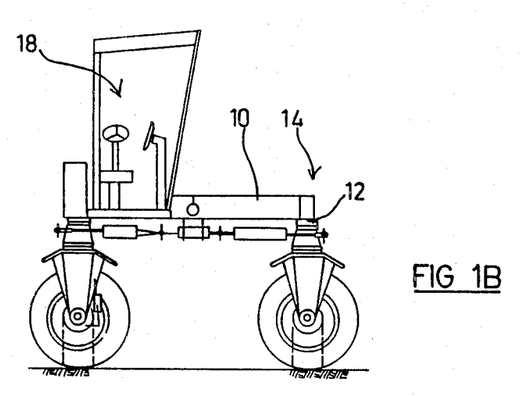
Figure 1C:
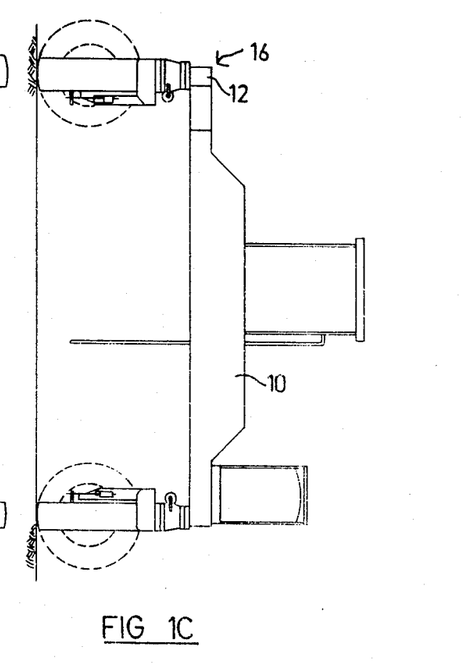

Reference is now made to FIGS. 1A–1C which illustrate a tractor constructed and operative in accordance with an embodiment of the present invention and comprising a body 10 which is mounted on a chassis 12. Body and chassis together define a front end 14 for off-highway operations and a front end 16 for highway operations. Associated with body 10 there are provided suitable steering and other controls 18 for both on and off-highway modes of operation.

It will be appreciated that although the present invention is being described in the context of a tractor, according to a preferred embodiment thereof, the invention is not necessarily limited to tractors and may alternatively be embodied in other types of vehicles. For convenience in the description and claims, the terms highway and off-highway are used to denote distinct modes of operation. By highway mode operation it is meant movement of the vehicle on a road or in any other application wherein a narrow wheelbase profile is required. By off-highway mode operation it is meant any application other than the above highway application, where the wide-wheelbase profile is desirable, such as for fieldwork.

The basic construction of the steering apparatus of the present invention will now be described with additional reference to FIG. 2. The steering apparatus comprises first, second, third and fourth wheels 20, 22, 24 and 26 respectively, each of which is independently pivotably and rotatably mounted onto chassis 12 about respective pivot axes 28, 30, 32 and 34. Axes 28, 30, 32 and 34 are preferably arranged at the vertices of a rectangle such that the separation between axes 28 and 30 is greater than the separation between axes 28 and 34.

Selectable orientation of the individual wheels is provided by positioning apparatus including first positioning apparatus comprising four individual piston and cylinder assemblies 36, 38, 40 and 42, associated with respective wheels 20, 22, 24 and 26, and which are fluid operated preferably hydraulically for selectably positioning the invidual wheels. Alternative types of linear positioning apparatus, such as, for example, screw drives, may also be used.

Piston and cylinder assemblies 36 and 38 are typically similar and each comprises a piston assembly including first and second pistons 44 and 46 arranged in back-to-back orientation for series operation in response to separate control inputs. As will be described hereinafter in detail, piston and cylinder assemblies 36 and 38 are used to enable pivotable turning of the tractor about a fixed pivot axis coincident with either of axes 32 and 34. The ratio of the strokes of the two pistons is functionally related to the ratio of the distance separating wheels 20 and 22 to that separating wheels 20 and 26.

Piston and cylinder assemblies 40 and 42 are typically similar and each comprises a single stage piston whose stroke is operative to provide a 90 degree rotation of its associated wheel.

Each of the piston and cylinder assemblies is coupled at one end via a connecting rod to its corresponding wheel for selectable positioning thereof. Assemblies 36 and 42 are pivotably coupled at their opposite ends to a fixed location in chassis 12.

Selectable orientation of the front wheels of the vehicle during operation in a highway mode is provided by a second positioning apparatus comprising a bidirectional fluid operated cylinder and piston combination 50 having a piston 52 to which are coupled piston and cylinder assemblies 38 and 40, instead of being attached to a fixed location as are assemblies 36 and 42. The operation of the second positioning apparatus will be described hereinafter in connection with FIGS. 3A and 3B.

It is appreciated that steering may be provided on all four wheels, individually, or as a further alternative on any pair of adjacent wheels.

Figure 2:
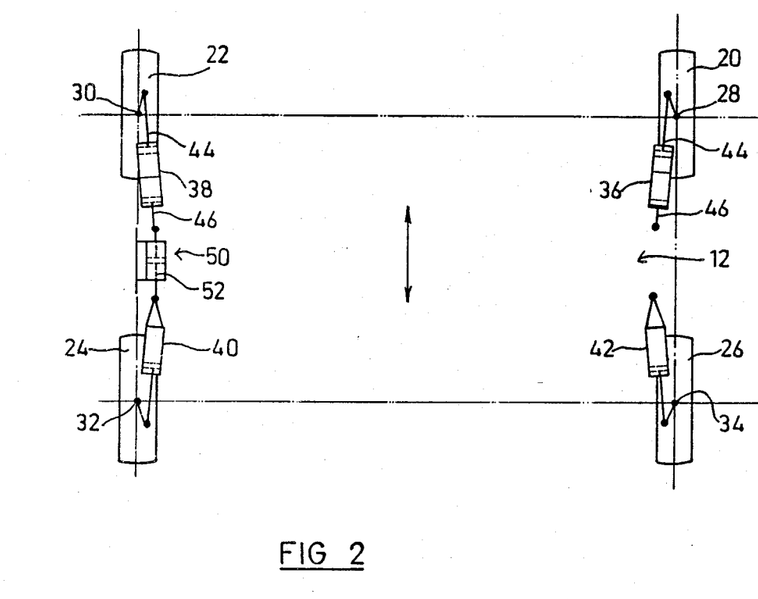
FIG. 2 is a top view illustration of the steering apparatus of a vehicle such as that of FIGS. 1A–1C arranged for off-highway operation.

FIG. 2 shows the wheels of the vehicle oriented for operation in an off-highway mode with a wide wheelbase profile. All of piston and cylinder assemblies 36, 38, 40, and 42 are fully extended. Steering in this mode is provided by suitable differential operation of hydraulic fluid pumps which power motors associated with each of the wheels. The motive system will be described hereinafter in connection with FIG. 6.

Figure 3A:
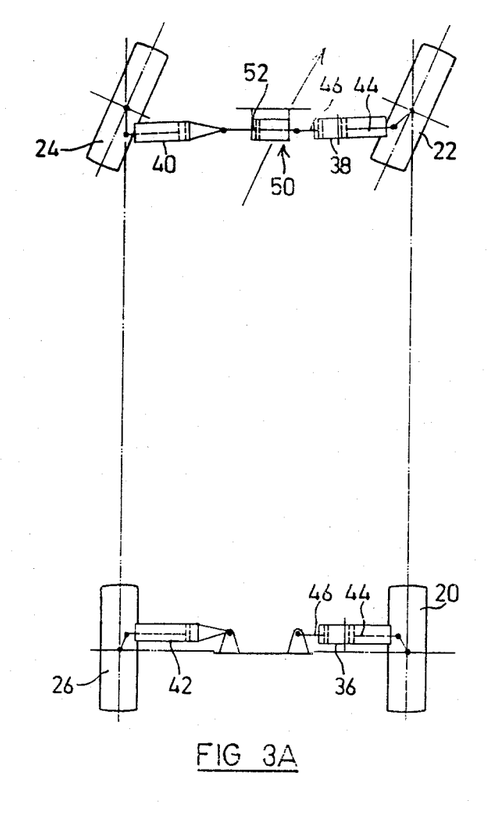
FIGS. 3A and 3B are top view illustrations of steering apparatus as shown in FIG. 2 arranged for highway operation and showing steering to the right and left respectively.
Figure 3B:
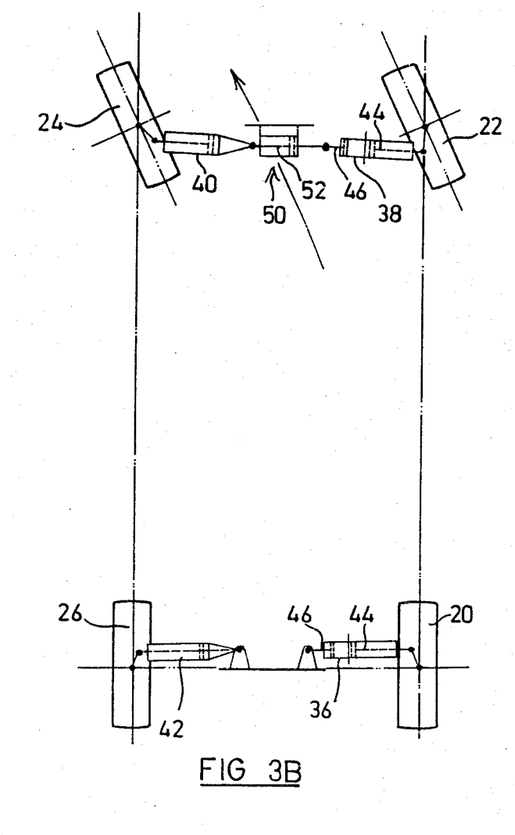

Reference is now made to FIGS. 3A and 3B which illustrate the vehicle of FIGS. 1A-1C and FIG. 2 having its wheels oriented for highway mode operation with a narrow wheelbase profile. Cylinder and piston assemblies 40 and 42 are both in their fully retracted orientations, while cylinder and piston assemblies 36 and 38 are partially retracted, having pistons 44 retracted and pistons 46 extended. Steering of the vehicle in the highway mode is provided solely by directional piston and cylinder combination 50 which positions the piston and cylinder assemblies 38 and 40 in accordance with the position of piston 52. FIG. 3A illustrates combination 50 with piston 52 in an extreme left orientation with respect to the direction of travel, thus producing steering to the extreme left.

It may be appreciated that conversion of the vehicle from operation in one mode to operation in the other mode is simply effected by suitable operation of the piston and cylinder assemblies and does not require motion of the vehicle.

Figure 4A:
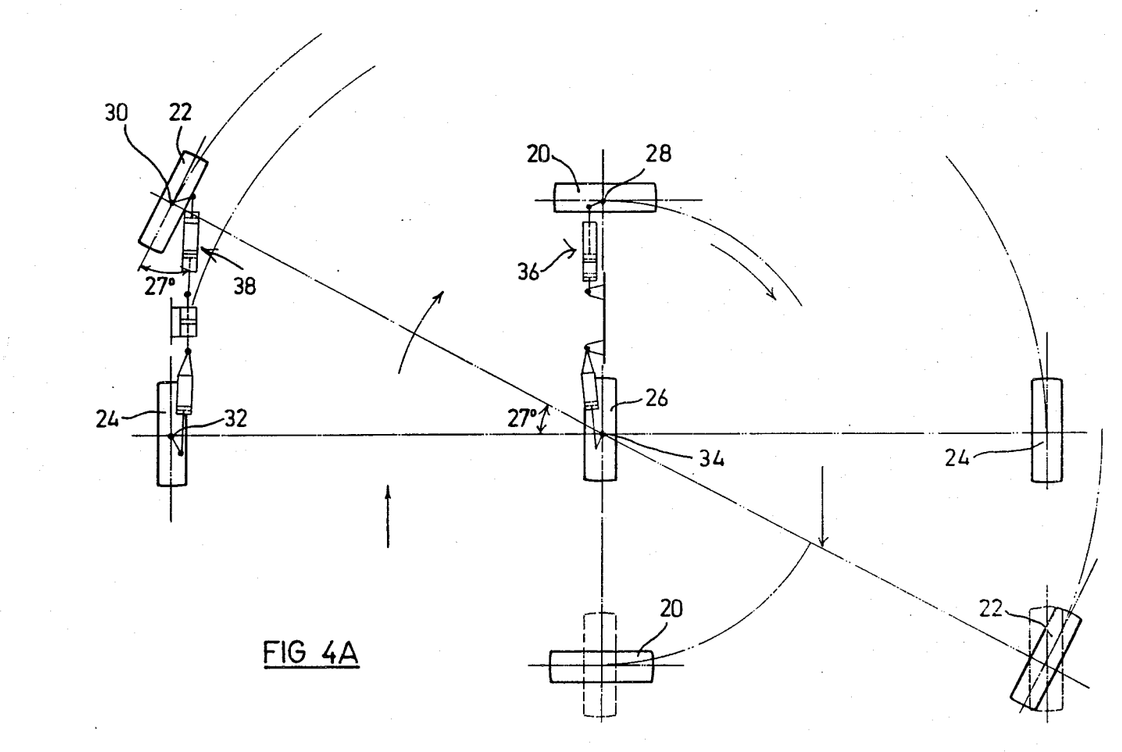
FIGS. 4A and 4B are top view illustrations of steering apparatus as shown in FIG. 2 executing respective right and lefthand pivot turns.
Figure 4B:
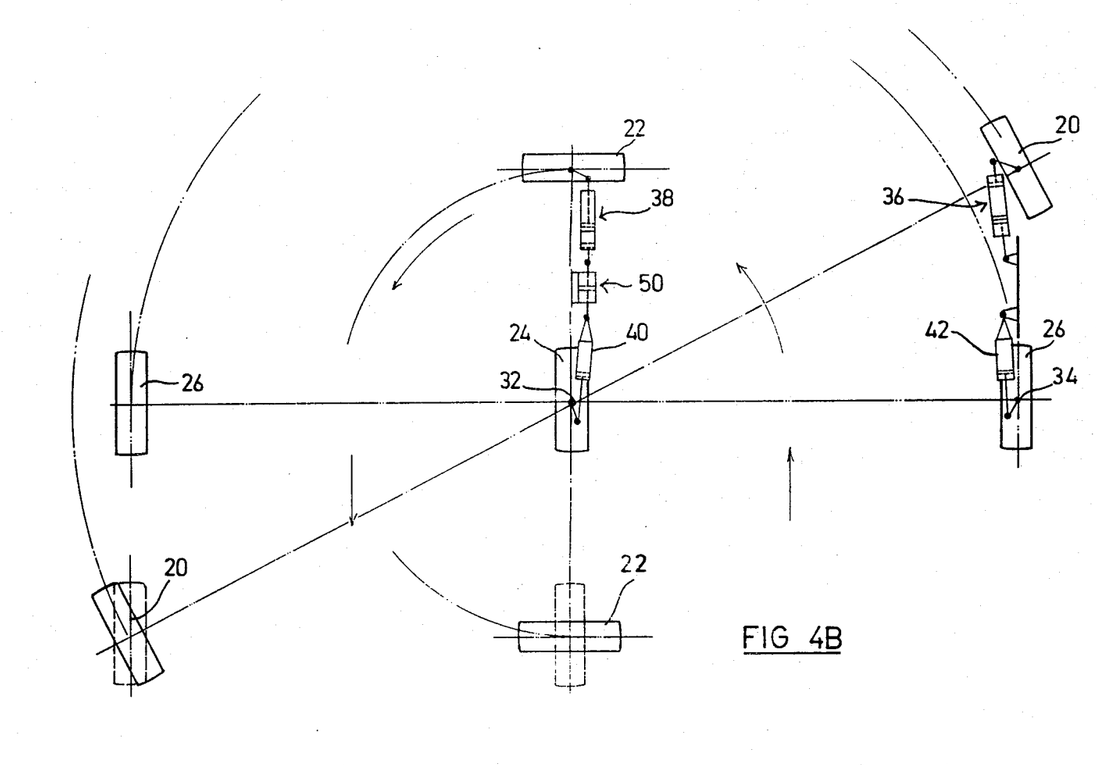

Reference is now made to FIGS. 4A and 4B which illustrate the technique whereby the vehicle may be turned about a fixed pivot defined at one of its wheels. Such precise and low radius turning is particularly useful for operation at the end of a row in a field, when it is desired to resume operation in the opposite direction in an adjacent row with the pivot wheel in the same channel. FIG. 4A illustrates clockwise rotation, while FIG. 4B illustrates counterclockwise rotation.

Considering FIG. 4A, a starting position identical to that shown in FIG. 2 may be assumed, typically at the end of a row of crops, shown in the upper left hand quandrant of FIG. 4A. The vehicle proceeds forward in the off-highway mode shown in FIG. 2 until its back wheels 24 and 26 are aligned such that their pivotal axes 32 and 34 are aligned with the end of the row or somewhat therebeyond. By suitable operation of the piston assemblies, each of the wheels is arranged to lie in a plane perpendicular to the imaginery line connecting its pivot axis to the axis about which vehicle rotation is desired, in this case, axis 34. It may thus be appreciated that wheel 24 stays in its off-highway mode orientation. Wheel 20 is shifted to its highway mode orientation, as seen in FIGS. 3A and 3B, by partial retraction of piston and cylinder assembly 36. Wheel 22 is moved to an orientation intermediate its extreme orientations by retraction of piston 46 and extension of piston 44 of assembly 38. The precise angle of orientation of wheel 22 is determined by the ratio of the lengths of the sides of the rectangle along whose vertices are located the pivot axes of the individual wheels. In a typical case, where the distance between axes 28 and 30 is 5.8 meters and the distance between axes 28 and 34 is 3.0 meters, the wheel 22 is oriented at approximately 27 degrees with respect to the axis connecting axes 30 and 32. The orientations of the individual wheels for turning about axis 34 are illustrated in FIG. 4A. By providing power to wheels 20, 22, and 24, the orientation of the vehicle is rotated from that shown in the upper left quadrant of FIG. 4A to that shown in solid lines in the lower right quadrant of FIG. 4A. Following this rotation, wheels 20 and 22 may be reoriented to their FIG. 2 off-highway mode positions as illustrated in dotted lines, and work of the vehicle can resume in an opposite direction along an adjacent axis with the pivot wheel in the same channel.

FIG. 4B illustrates counterclockwise rotation about axis 32. In this case, wheel 20 is provided with a desired angled orientation by retraction of piston 46 and extension of piston 44 of assembly 36, while wheel 22 is oriented in its highway mode orientation by extension of piston 46 and retraction of piston 44 of assembly 38. Wheel 26 stays in its off-highway mode orientation. The remainder of the rotation is clear from the above description of clockwise rotation with reference to FIG. 4A.

It is noted that during turning, it is necessary to maintain the wheel which defines the pivot axis totally stationary, in order to provide true pivotal motion. This is achieved by the application of a brake to the wheel during turning.

Figure 5A:
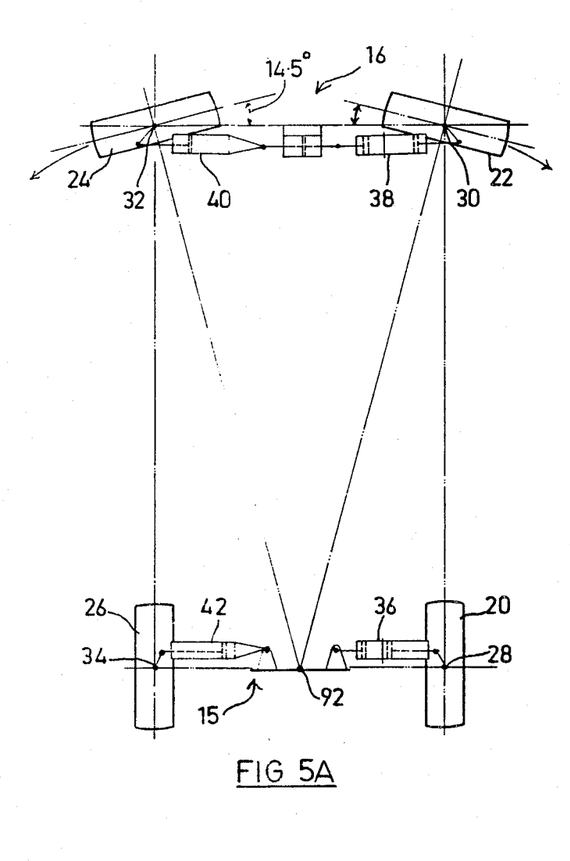
FIGS. 5A, 5B and 5C are top view illustrations of steering apparatus as shown in FIG. 2, and which show steering configurations for full turns in clockwise and counterclockwise directions about first and second end pivot points and a pivot point located in the geometric center of the apparatus, respectively.
Figure 5B:
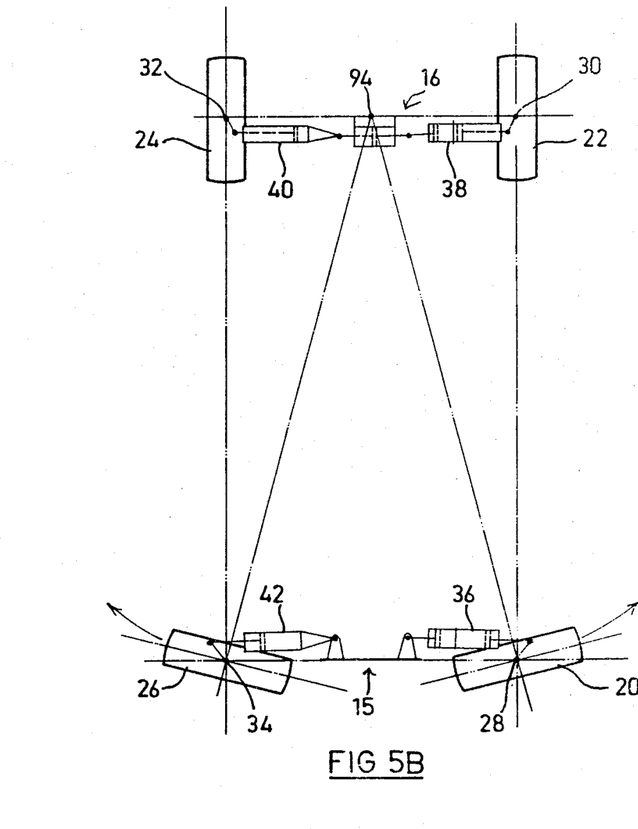
Figure 5C:
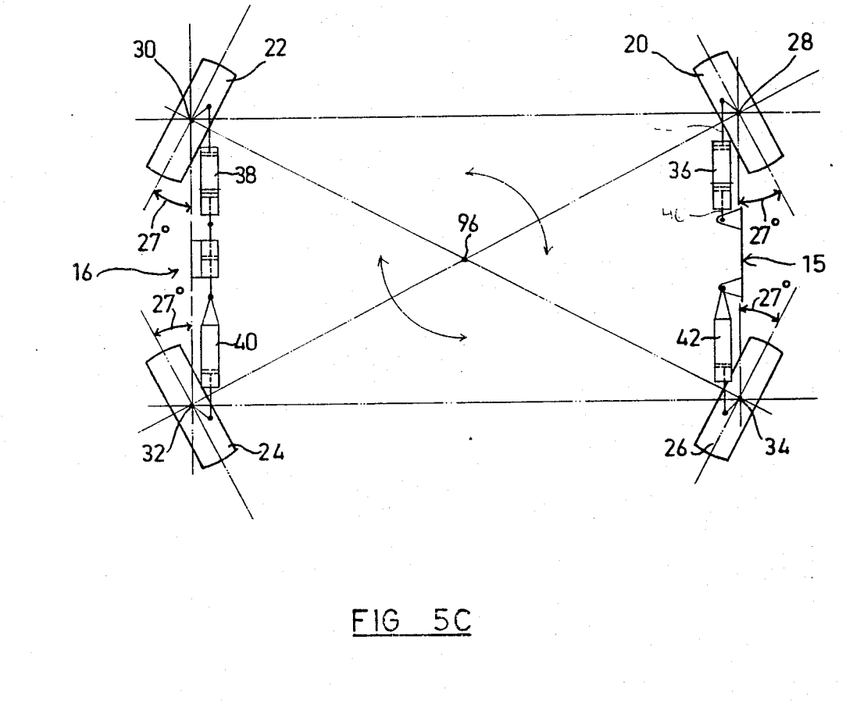

Reference is now made to FIGS. 5A, 5B and 5C which illustrate the technique whereby the vehicle may be turned in either a clockwise or counterclockwise direction about a fixed pivot defined at points located halfway between axes 28 and 34, halfway between axes 30 and 32 and at its geometric center, denoted respectively by reference numerals 92, 94 and 96. Turning about any of these three points may be performed when it is desired to totally reverse the direction of travel.

With reference to FIG. 5A, the vehicle, which, by way of example may be considered to have started in a highway mode of operation, in order to carry out a turn about pivot point 92, located at rear end 15, maintains back wheels 20 and 26 in a highway alignment, and by suitable operation of the piston assemblies, each of wheels 22 and 24 is arranged to lie in a plane perpendicular to the imaginery line connecting their respective pivot axes to the point about which vehicle rotation is desired.

Wheels 22 and 24 are moved to orientations between their extreme orientations by partial retraction of piston 46 and extension of piston 44 of assembly 38, and by partial retraction of piston and cylinder assembly 40. The precise angles of orientation of wheels 22 and 24 are determined by the ratio of lengths of the sides of the triangle defined by vertices located at points 30, 32 and 92.

In a typical case, where the distance between axes 28 and 30 is 5.8 meters and the distance between axes 28 and 34 is 3.0 meters, wheels 22 and 24 are oriented at 14.5 degrees approximately, with respect to the axis connecting axes 30 and 32. The orientations of the individual wheels for turning about pivot point 92 are illustrated in FIG. 5A. By providing powder to wheels 22 and 24, the orientation of the vehicle is rotated from that shown in FIG. 5A to any required position wherein point 92 is fixed and wheels 22 and 24 lay on a circle defined by their rotation about that point.

FIG. 5B illustrates rotation about pivot point 94 located halfway between axes 30 and 32 at front end 16 of the vehicle. In this case, wheels 20 and 26 are provided with a desired angled orientation by partial retraction of piston 46 and extension of piston 44 of assembly 36, and by partial extension of piston and cylinder assembly 42, while wheels 22 and 24 remain in highway mode orientation. The remainder of the rotation is clear from the above description of rotation with reference to FIG. 5A.

FIG. 5C illustrates rotation about pivot point 96 located at the geometric center of the vehicle. By suitable operation of the piston assemblies, each of the four wheels 20, 22, 24 and 26 is arranged to lie in a plane perpendicular to the imaginary line connecting their respective pivot axes to the point about which vehicle rotation is desired.

Each of the wheels 20, 22, 24 and 26 is moved to an orientation between its extreme orientation by respective retraction of piston 46 and extension of piston 44 of assembly 36, by extension of piston 44 and retraction of piston 46 of assembly 38, by partial retraction of piston and cylinder assembly 40, and by partial retraction of piston and cylinder assembly 42. The precise angles of orientation of the wheels are determined by the ratio of lengths of the sides of the triangles defined by vertices located at points 28, 30, 32, 34 and 96.

In a typical case, where the distance between axes 28 and 30 is 5.8 meters and the distance between axes 28 and 34 is 3.0 meters, the wheels are oriented at approximately 27 degrees with respect to the axes connecting axes 30 and 32, and 28 and 34. The orientations of the individual wheels for turning about pivot point 96 are illustrated in FIG. 5C. By providing power to all of the wheels, the orientation of the vehicle is rotated from that shown in FIG. 5C to any required position wherein point 96 is fixed and wheels 20, 22, 24 and 26 lay on a circle defined by their rotation about point 96.

Figure 6:
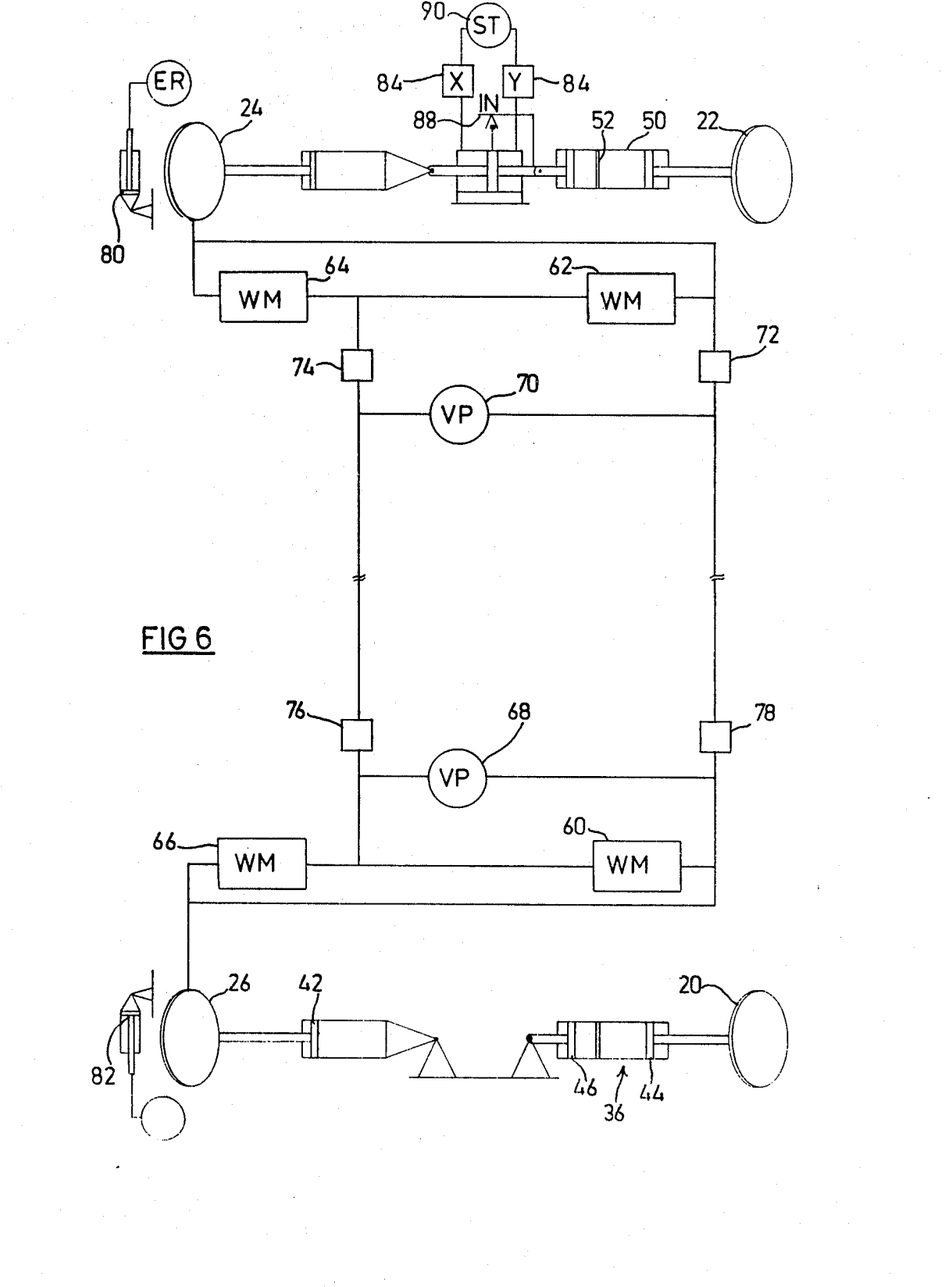
FIG. 6 is a schematic illustration showing the hydraulic motive system and brake system for the tractor of FIGS. 1A–1C as well as the steering apparatus illustrated elsewhere.

Reference is now made to FIG. 6 which illustrates hydraulic motive apparatus as well as brake apparatus for a tractor of the type described hereinabove. The hydraulic motive system comprises four wheel motors, 60, 62, 64 and 66, each associated with a respective wheel 20, 22, 24 and 26 for driving engagement therewith. Motors 60 and 66 are arranged in series with a variable hydraulic pump 68, while motors 62 and 64 are arranged in series with a variable hydraulic pump 70. According to the illustrated embodiment of the present invention, first and second remotely operable valves 72 and 74 govern the supply of hydraulic fluid from pump 70 to motors 62 and 64. Alternatively such valves may be associated additionally or alternatively with motors 60 and 66 and pump 68.

Third and fourth remotely operable valves 76 and 78 govern hydraulic fluid communication between pumps 68 and 70. According to a preferred embodiment of the invention, valves 72 and 74 are closed during highway mode operation, when all the motive power is supplied to the back wheels of the vehicle. Alternatively, all of the power may be supplied in such a case to the front wheels, or, as a further alternative, supplied to all of the wheels.

Further in accordance with an embodiment of the invention, valves 76 and 78 are normally closed during off-highway operation except during pivot turns, in order to permit steering to be achieved by determining the relative amount of hydraulic fluid supplied to the wheels at the two sides of the vehicle.

In order to provide desired braking of the pivot wheels during pivot turns as described hereinabove, hydraulically operated brake apparatus 80 and 82 are associated with respective wheels 24 and 26.

It is appreciated that control of the operation of the vehicle and of its turning functions is provided by suitable hydraulic controls. According to a preferred embodiment of the invention, the control of the individual pistons and valves is grouped according to function, such that indication of a given function actuates the individual pistons and valves in a desired way. This grouping may be achieved by suitable mechanical, fluidic or electrical logic circuitry.

In addition to the valves and pistons described hereinabove, there are also provided valves 84 which lock the bidirectional steering piston 52 in its central position by preventing fluid communication with both sides of the piston 52 in cylinder 50. The central position is determined by a suitable optical, mechanical or other indicator 88. Steering in the highway mode is provided by a bidirectional steering valve 90.

Figure 7:
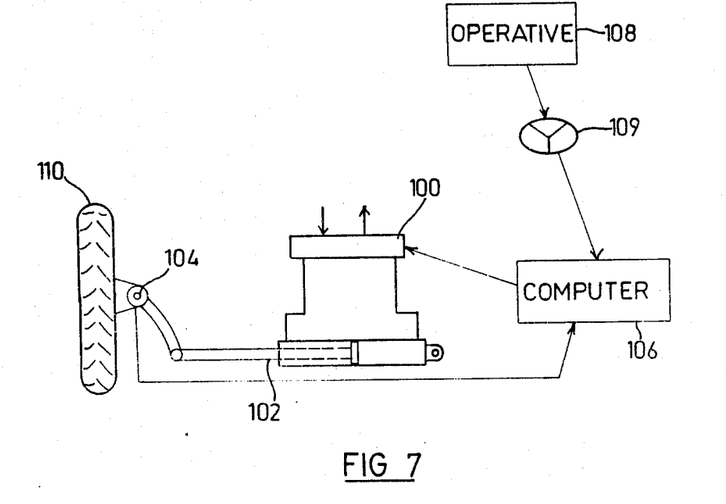
FIG. 7 is a schematic illustration of computer controlled electronic steering apparatus in accordance with the present invention.

The operation of the logic circuitry may be understood by reference to the following truth table which is arranged by function and indicates the operation state of the various valves and pistons, and wherein the following orientations correspond to code letters as follows:

reading information being received from angular resolver 104.

If the information received therefrom indicates that the wheel angle needs to be changed, computer 106 sends a signal for the operation of valve 100 in order to operate piston 102. The angle of wheel 110 is again checked, and the above-described sequence of operating valve 100 and rechecking the angle is repeated, until the instruction from operative 108 has been carried out. It will be appreciated by those skilled in the art that the above-described sequence typically takes fractions of a second to be completed.

|  | OFF HIGHWAY | | A |
|---|---|---|---|
|  | HIGHWAY | | B |
|  | RIGHT TURN | (FIG. 4A) | C |
|  | LEFT TURN | (FIG. 4B) | D |
|  | REAR TURN | (FIG. 5A) | E |
|  | FRONT TURN | (FIG. 5B) | F |
|  | CENTER TURN | (FIG. 5C) | G |

| | PISTONS | | | | | | VALVES | | | | BRAKES | | VAL IN | VAL |
|---|---|---|---|---|---|---|---|---|---|---|---|---|---|---|
| | 44/36 | 46/36 | 42 | 44/38 | 46/38 | 40 | 74 | 72 | 76 | 78 | 82 | 80 | 84 | 88 | 90 |
| A | + | + | + | + | + | + | + | + | + | − | − | − | − | 0 | 0 |
| B | − | + | − | − | + | − | − | − | + | + | − | − | + | # | # |
| C | − | + | + | + | − | + | + | + | + | + | + | − | − | 0 | 0 |
| D | + | − | + | − | + | + | + | + | + | + | − | + | − | 0 | 0 |
| E | − | + | − | + | /− | /− | + | + | − | − | − | − | − | 0 | 0 |
| F | + | /− | /− | − | + | − | − | − | + | + | − | − | − | 0 | 0 |
| G | + | − | /− | + | − | /− | − | − | − | − | − | − | − | 0 | 0 | where for pistons:
− indicates retracted
+ indicates extended
/− indicates partially retracted
/+ indicates partially extended
and for valves: − indicates closed
and indicators:
+ indicates open
# indicates bidirectional operation
0 indicates central point location
and for brakes
+ indicates engaged
− indicates disengaged Reference is now made to FIG. 7, which shows a computer controlled steering system that may be used in conjunction with a preferred embodiment of the present invention.

There is shown an hydraulic valve 100, to which is connected an hydraulic piston 102. Hydraulic piston 102 is associated with a wheel 110, upon which is located an angular resolver 104, which device is sensitive to changes in orientation of the wheel, and may comprise a device such as a potentiometer.

Valve 100 and resolver 104 are both connected to a computer 106, that is adapted to receive information from resolver 104 concerning the orientation of wheel 110, and which is also adapted to send signals to valve 100 for the operation thereof, which operation changes the orientation of wheel 110 by the operation of piston 102.

The hereinabove described computerized system is adapted to be incorporated into a steering system, wherein a central computer may control any number of wheels according to instructions from an operative 108, as hereinbelow described.

Figure 8:
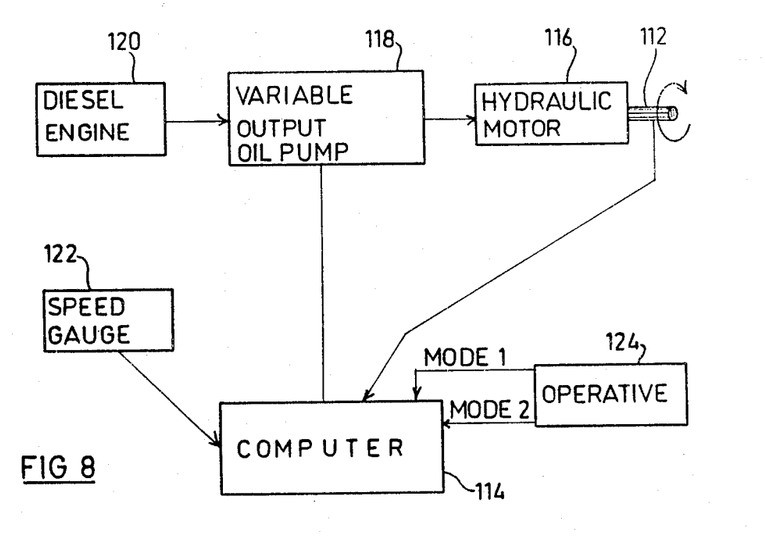
FIG. 8 is a block diagram illustration of a system for computer regulation of the Power Take Off transmission system in accordance with the present invention.

Instructions are fed into the computer by operative 108 by turning a steering wheel 109 as in normal steering operations, the particular feature being, that steering wheel 109 used in conjunction with the computerized system of the present invention is connected with computer 106, such that when steering wheel 109 is turned, computer 106 interprets the turn as an instruction to check on the angular orientation of a wheel by Reference is now made to FIG. 8, which shows a block diagram illustration of a system for computer control of a Power Take Off transmission system of a tractor.

A Power Take Off transmission system (PTO), is used for transferring power to agricultural machinery that is attached to a tractor. It comprises a shaft having longitudinal grooves, and is constructed for engagement with a power transfer point on the machinery.

The shaft is designed to be rotated at speeds of up to 1200 revolutions per minute (RPM) and its rotation speed is directly connected to that of a diesel engine powering the tractor, such that if the machinery that is being powered by the tractor needs power to be supplied, for example, at 1200 RPM, even if the tractor engine would otherwise need to turn at a much lower rate, the engine must turn faster, according to the needs of the machinery to which power is being supplied: this obviously causes a great waste of fuel.

There is shown in FIG. 8 a transmission system, that is designed to transfer power to machinery by way of a PTO 112 of a tractor, but which is not linked to the engine speed.

PTO 112 is connected to an hydraulic motor 116, which is connected to a variable output oil pump 118, which is itself connected to a diesel engine 120. Both PTO 112 and oil pump 118 are connected with a computer 114, to which are also connected to a speed gauge 122, which may typically be calibrated in km/h, and means for an operative 124 to program the computer in either one of two modes of operation, both of which will be described hereinbelow.

In a first mode of operation, operative 124 may program computer 114 to set PTO 112 to rotate at a particular rate of rotation in RPM. This is done by using means such as a thumbwheel connected to the computer. Once computer 114 has received a command as hereinabove described, it can check the rate of rotation of PTO 112, which, prior to operations, will typically be at rest.

According to an increased or decreased need in the rate of rotation of PTO 112, computer 114 sends a signal to variable output oil pump 118 to correspondingly increase or decrease its supply of oil to hydraulic motor 116, which increase or decrease will immediately cause a commensurate increase or decrease in the speed of rotation of PTO 112.

The process of checking the speed of rotation of PTO 112 and accordingly adjusting the oil supply to hydraulic pump 116 will continue, until equilibrium is reached between the oil supply thereto and the desired RPM of PTO 112. Using the system hereinabove described, the only increased burden on diesel engine 120 is that of providing a sufficient supply of oil to oil pump 118, providing far less fuel waste than the method conventionally used.

In a second mode of operation of the above-described system, operative 124 chooses to fix the rate of rotation of PTO 112 in accordance with the speed of advance of the tractor.

In this mode, operative 124 programs computer 114 to a set speed, typically in km/h, and computer 114 then checks speed gauge 122 for agreement with the speed programmed thereinto. If any change in tractor speed is needed, computer 114 sends a signal to oil pump 118 to accordingly change its rate of supply of oil to hydraulic motor 116, which change is accomodated by a change in the speed of diesel engine 120, and which also causes a commensurate change in the rotation speed of PTO 112.

As with the first mode of operation, the process of checking the tractor speed and adjusting the oil supply to hydraulic motor 116 continues until equilibrium is reached between the programmed speed and the actual speed of the tractor.

It will be appreciated by those skilled in the art, that the above-described sequence of checking and sending signals and of rechecking, typically takes fractions of seconds to be completed.

It should be noted that computer 114, and computer 106, as described hereinabove with reference to FIG. 7, would, in a preferred embodiment of the present invention, be incorporated into a single computer.

It will be appreciated by persons skilled in the art that the present invention is not limited to what has been particularly shown and described hereinabove. Rather the scope of the present invention is defined only by the claims which follow:

I claim:

1. A tractor comprising:
    a chassis:
    steering apparatus including:
    first, second, third and fourth wheels, each pivotably and rotatably mounted onto said chassis;
    first positioning means for selectably positioning said first, second, third and fourth wheels in first and second extreme positions and for selectably positioning said first and second wheels at predetermined angled positions intermediate said first and second extreme positions;
    second positioning means associated with said second and third wheels and operative to provide selectable steering of said second and third wheels,
    said first, second, third and fourth wheels being pivotably mounted at vertices of an imaginary rectangle, whereby said first and second wheels are separated by a first distance, said third and fourth wheels are separated by said first distance, said second and third wheels are separated by a second distance and said first and fourth wheels are separated by said second distance, said first distance being greater than said second distance, wherein first distance represents the tractor wheelbase for off-highway operation and said second distance represents the tractor wheelbase for highway operations, said first and second wheels being selected to be at the front leading end of said tractor for off-highway operations and said second and third wheels are selected to be at the front leading end of said tractor for highway operations,
    said first positioning means comprising first, second, third and fourth fluid operated piston and cylinder assemblies associated with said first, second, third and fourth wheels respectively for providing selectable pivotal positioning thereof,
    the stroke lengths of all of said first, second, third and fourth fluid-operated piston and cylinder assemblies each providing a 90 degree pivot range for an associated wheel,
    said second positioning means comprising a bidirectional piston assembly which is coupled to said second and third piston and cylinder assemblies in a series arrangement,
    said second positioning means also comprising means for locking said bidirectional piston assembly in a central position only when the tractor is operated for off-highway operations.

2. Steering apparatus according to claim 1, and also comprising fluid operative motive means for said vehicle, said motive means including first, second, third and fourth hydraulic motors, each associated with a vehicle wheel and first and second variable hydraulic pumps, each providing a selected amount of hydraulic fluid.

3. Steering apparatus according to claim 2 and also comprising first valve means for selectively preventing hydraulic fluid communication between said first and second pumps and vehicle wheels associated wherewith.

4. Steering apparatus according to claim 3 and wherein said first valve means is operative to selectively prevent hydraulic fluid communication between said first and fourth wheels and between said second and third wheels, thereby to effect steering of the vehicle in said off-highway mode.

5. Steering apparatus according to claim 4, and also comprising brake means for selectively engaging a wheel during pivot turning motion thereabout.

6. Steering apparatus according to claim 5, and also comprising second valve means for isolating a pair of said vehicle wheels from a supply of hydraulic fluid during highway mode operation.

7. Steering apparatus according to claim 1, and also comprising:
    a computer operative to provide control signals to said first and second positioning means; and an angular resolver, associated with at least one of said first, second, third and fourth wheels and adapted to 'read' the angle of pitch of said at least one wheel and to feed that information to said computer.

8. Steering apparatus according to claim 7, and wherein said angular resolver comprises apparatus including a potentiometer.

9. A tractor according to claim 7, and wherein said computer regulates the hydraulic power that said tractor is operative to supply to hydraulically powered machinery connected thereto, said hydraulic power being directly related to the rate of revolutions of an hydraulic motor, said tractor additionally comprising:
- a variable output oil pump, supplying oil to said hydraulic motor and which is connected to said computer;
- a diesel engine, associated with said tractor and connected to said oil pump; and
- a speed gauge, which is operative to measure the speed of advance of said tractor and which is connected to said computer.

* * * * *